Nov. 24, 1970   J. M. GIZDICH   3,541,685

TOOL FOR PUNCHING HOLES IN METAL STUDS

Filed Oct. 29, 1968

INVENTOR.
JERRY M. GIZDICH
BY
William R. Piper
ATTORNEY

United States Patent Office

3,541,685
Patented Nov. 24, 1970

3,541,685
TOOL FOR PUNCHING HOLES IN METAL STUDS
Jerry M. Gizdich, 2511 Oaks Drive,
Hayward, Calif. 94542
Filed Oct. 29, 1968, Ser. No. 771,543
Int. Cl. B26f 1/00
U.S. Cl. 30—363  4 Claims

ABSTRACT OF THE DISCLOSURE

A portable hand tool for punching holes in metal studs comprising two handles, one handle carrying an abutment designed to contact with the inner side of a metal stud, the two sides of the channel-shaped stud being disposed on opposite sides of the abutment. The other handle is operatively connected to the first handle and carries a cutting tooth that will initially overlie the outer surface of the stud and be positioned adjacent to the abutment. A swinging movement of the handle that carries the stud cutting tooth, will cause the tooth to penetrate the metal stud to cut a hole therein, the portion of metal that is cut, being bent against the adjacent flange or side of the stud.

BACKGROUND OF THE INVENTION

Field of the invention

Channel-shaped metal studs are frequently being used in place of wooden studs in the erection of buildings. This is especially true where the stud is used to support a curtain partition that does not have to support any weight. The metal stud may have one or more openings therein through which electrical conduit and the like may be passed. However, in many instances, after the metal stud has been placed in position in the building, the electrician in wiring the building will find that an additional one or more holes are needed in the metal stud through which to pass the wires so that they will be nearer to the electrical outlet that is being wired. This will result in a saving of wire or electrical conduit. Where many electrical outlets are to be wired in a building and where shorter lengths of wires or electrical conduits can be effected because additional openings can be made in the metal studs that are closer to the electrical outlets, it will be evident that an appreciable saving of electrical conduit and wiring will result.

SUMMARY OF THE INVENTION

An object of my invention is to provide a tool for punching holes in metal studs that can be used by an electrician or the like. The tool has an abutment integral with one of the two handles and when the electrician wishes to make an opening in the metal stud, he grasps the handle with the abutment and positions the latter at the desired place on the inner side of the stud where the opening is to be made. The other handle is operatively connected to the first handle by linkage that spaces the stud cutting tooth, carried by the other handle, away from the stud during the initial positioning of the abutment on the stud. When this is accomplished the links are long enough to permit the cutting tooth carrying handle to be moved to place the tooth on the outside of the channel and opposite to the abutment. The handles can now be moved for causing the tooth to cut another opening in the metal stud. It is not necessary to dismantle the tool to remove it from the metal stud. In addition, the cut material does not have to be cleaned from the tool nor does the cut material drop upon the floor where it later must be removed.

DESCRIPTION OF THE PREFERRED EMBODIMENT

Figure 1:
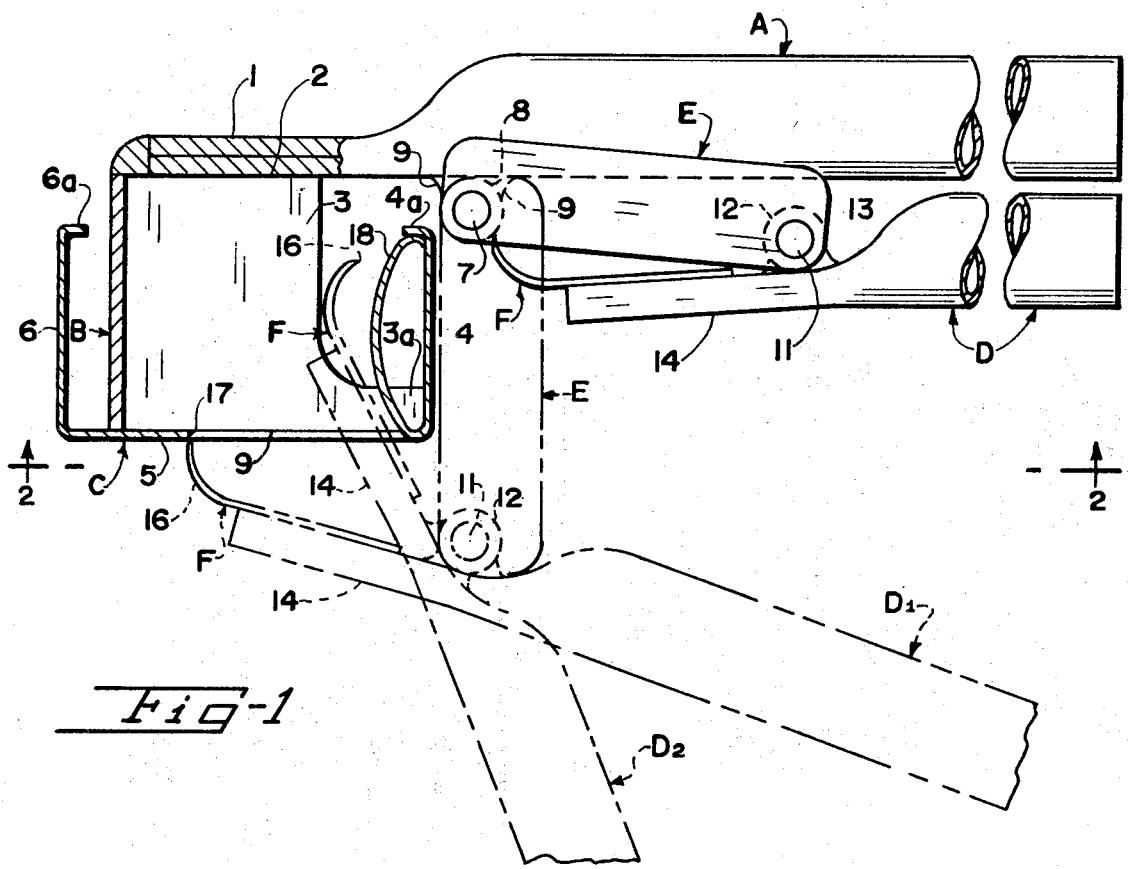
FIG. 1 is a side elevation of the tool with two handles in a position to place the cutting tooth at one side of the abutment so that the abutment can be placed within the interior of the channel-shaped metal stud. A dash double dot line showing in the same figure, illustrates the links and the cutting tooth carrying handle in a position to place the tooth on the outer surface of the stud, preparatory to punching an opening in the stud. A dot dash line showing illustrates the tooth carrying handle swung for causing the tooth to pierce the stud and swing the cut piece of metal up against the inner surface of one of the stud side walls.
Figure 2:
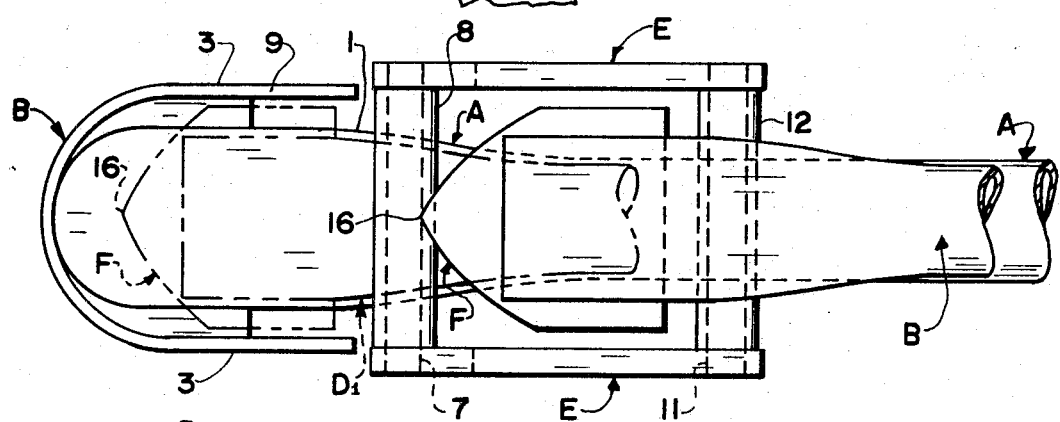
FIG. 2 is a plan view of FIG. 1 when looking in the direction of the arrows 2—2 in FIG. 1. The cutting tooth carrying handle is shown in another position by the dash double dot lines.

In carrying out my invention, I provide a tool that has a tubular handle A, see FIGS. 1 and 2. One end of the handle is flattened as at 1, and a U-shaped abutment B, has its edge 2 welded to the flattened end 1. The two side walls 3 of the abutment are interconnected by the arcuate portion and FIG. 1 shows the side walls provided with extensions 3a that contact with one of the sides 4 of a metal channel-shaped stud C when the operator moves the tool for placing the abutment B, within the interior of the channel. These extensions 3a will act as positioning members for the abutment with respect to the stud. It is possible to make the flattened end 1, longer and bend the outer portion at right angles and have its outer end contact with the inner surface of the web 5 of the stud and have this outer end act as an abutment and take the place of the abutment B. This would make the tool less expensive to manufacture, but the operator would have to exercise additional skill in placing the bent outer end, not shown, of the flattened portion 1, in the proper place in the stud. The web 5 of the stud lies between the sides 4 and 6 and the sides may have inwardly bent flanges 4a and 6a for adding rigidity to the stud.

A second tubular handle D is pivotally connected to the handle A by a pair of links E—E, see FIGS. 1 and 2. Both links have one of their ends connected to a pin 7, and the latter is rotatably mounted in a sleeve 8, that in turn is welded at 9 to the tubular handle A. The axis of the pin 7 parallels the plane of the outer edge 10 of the U-shaped abutment B. The other ends of both links E are connected to another pin 11, and the latter is rotatably mounted in another sleeve 12 that is welded at 13 to the flattened portion 14 of the handle D.

The flattened portion 14 of the handle D, has the base 15 of a stud cutting tooth F, welded or otherwise secured thereto, see FIG. 1. The pointed and cutting end 16 of the tooth extends beyond the end of the flattened portion and it is curved in the manner shown in FIG. 1. When the links E are swung so as to lie substantially parallel with the handle A, the tooth F will be moved to the right in FIG. 1 so as to be positioned to one side of the abutment B. This will permit the operator to place the abutment B of the tool within the channel-shaped stud and move the abutment to the desired place where the additional opening is to be made in the stud.

The operator can now move the handle D away from the handle A and this will swing the links E—E into parallel relation with the side 4 of the stud C, see FIG. 1. During this movement the cutting tooth F will be swung over the outer side of the stud web 5 and the piercing point 16 of the tooth will be ready to be forced into the stud for cutting the opening, note the double dot dash line position of the handle D, indicated at this position at D1 in FIG. 1. A plan view of the D1 position of the handle D is shown by the double dot dash lines in FIG. 2.

Figure 3:
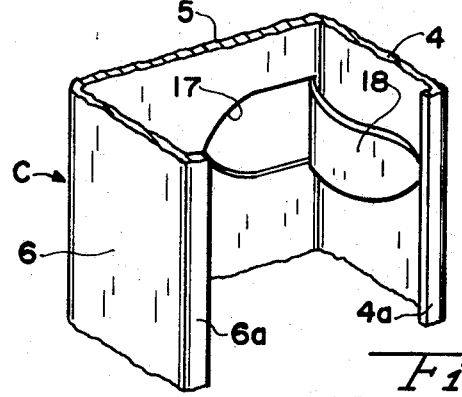
FIG. 3 is an isometric view of a portion of the metal stud and shows the opening therein made by the tool and further shows the cut out piece folded adjacent to the inner surface of the channel side wall.

The operator can now pierce an opening in the web 5 of the stud C by swinging the handle D from the double dot dash line position D1 in FIG. 1, into the dot dash line position D2 in the same figure. The swinging of the handle D away from the handle A will cause the pointed curved end 16 of the tooth F to pierce the web 5 and form the opening 17 in the web, see also FIG. 3. The tooth F in forming the opening will swing the cut flap 18 up against the inner surface of the stud wall 4 as shown in FIGS. 1 and 3. The electrician or other workman may pass electrical conduit and the like through this opening.

I claim:
1. A tool comprising:
   (a) a first handle with an abutment adapted to contact with the inner side of a channel-shaped stud;
   (b) a second handle having a cutting tooth; and
   (c) operative means interconnecting the two handles and including at least one link having a pivotal connection at one end with said first handle and having a pivotal connection at its other end with said second handle, said link being swingable for permitting the second handle to be moved to position said cutting tooth on the outer side of the stud and near to said abutment;
   (d) whereby a swinging movement of the second handle about its pivotal connection with said link will move said tooth through the adjacent surface of the stud for cutting an opening therein.

2. The combination as set forth in claim 1: and in which
   (a) the abutment has a U-shaped rim adapted to be brought into contact with the stud; and
   (b) the link when swung into a predetermined position will move the second handle to place the cutting tooth in relation to said abutment so that the swinging movement of the second handle will cause the tooth to cut the opening in the stud within the area defined by the U-shaped rim of the abutment.

3. The combination as set forth in claim 1: and in which
   (a) the link is swingable into a position for moving the second handle so that its cutting tooth is moved to one side of the stud;
   (b) the link when swung into operative position being long enough to permit the second handle to position its cutting tooth on the outer side of the stud while the abutment contacts with the inner side of the stud;
   (c) whereby a swinging movement of the second handle will move the tooth into the stud for cutting an opening therein.

4. The combination as set forth in claim 1: and in which
   (a) the means for operatively connecting the two handles includes a pair of links arranged on opposite sides of the two handles, the pivot point between the links and the first handle being spaced from the abutment to permit one side of the stud to be received between the abutment and said pivot point;
   (b) the pivot point between the links and the second handle lying between the hand-gripping portion of the handle and the cutting tooth, the links being of a length so that when they are swung into an inoperative position, they will position the second handle and tooth to one side of the stud so that the abutment can be moved into the interior of the stud, and when they are swung into operative position they will move the second handle so that it will move its cutting tooth from the position lying adjacent to the side of the stud, itno a position where the tooth will be disposed on the outer side of the stud and adjacent to the abutment.

References Cited
UNITED STATES PATENTS 2,360,111 10/1944 Dedona _____ 30—363
2,823,452 2/1958 Segal _____ 30—16 XR GRANVILLE Y. CUSTER, Jr., Primary Examiner U.S. Cl. X.R.

72—326